United States Patent Office 3,216,877
Patented Nov. 9, 1965

3,216,877
METHOD OF MOLDING PLASTIC PARTS
John G. Mohr, Maumee, Ohio, assignor to Johns-Manville Corporation, New York, N.Y., a corporation of New York
No Drawing. Filed Oct. 9, 1961, Ser. No. 143,602
1 Claim. (Cl. 156—230)

This invention relates to a new method of preparing matched die molded resinous articles and particularly, this invention relates to a method of surfacing matched die molded resinous articles containing reinforcing fibers. The invention provides a new and relatively easy method of providing a resin-rich surface for fiber reinforced articles so as to impart good weathering and other desirable properties thereto. Glass fiber reinforced polyester resinous products have been advantageously and markedly improved using the method of the instant invention.

HISTORY

While the use of glass or other reinforcing media has provided a completely new field of plastic articles, such articles have, nevertheless, been characterized by certain deficiencies. Specifically, the surface attrition of fiber reinforced plastic articles resulting in serious "fiber blooming" during outdoor use is well known in building and architectural circles. Particularly confronted with this problem are the manufacturers of matched die molded glass fiber reinforcing polyester products.

Subjecting such products to outdoor use for even short periods of time, e.g., two or three years, causes the fibers to rise to the surface and presents an unattractive and uneven finish. The items, such as lamp shades, generally have a complete loss of gloss and assume a very poor appearance with the loose fibers collecting dirt and similar materials, all of which has led to an unfavorable reputation for performance for molded reinforced plastic articles. The need for improving the weather resistance and general surface properties of molded articles has been a constant source of discussion within the industry. To date, no completely satisfactory solution to this problem has been found.

Of the several attempts to overcome the problem, one method has been used with nominal success and should be mentioned. The method utilizes a gelable resinous material which generally corresponds to the resin composition of the article and is applied to the surface of the mold. Subsequently when the fiber-reinforced resin article is introduced into the mold for shaping to the desired configuration, the resin gel is transformed from the mold to the surface of the article and integrally united to the article to, in effect, provide a resin-rich surface. The substance of this method may be illustrated by U.S. Letters Patent No. 2,817,619.

However, in the case of polyester resins such a process has definite serious drawbacks. Specifically, because the gel is supplied from a monomeric resin medium, such as styrene, and further because the conditions necessary to effect the transfer of the gel involve very high temperatures, the gel, because of the monomer, emits hot, toxic fumes. These fumes are, of course, considered rather dangerous, and it has been a long felt desire in the art to overcome this disadvantage. Moreover, the products resulting from this process while possessing better physical properties including weathering, have, nevertheless, exhibited surface fibers.

Among the other attempts to overcome the problem, the use of laminating principles similar to those described in U.S. Letters Patent No. 2,769,742, should be noted.

OBJECTS

It is therefore a principal object of this invention to provide a new method of producing matched die molded parts to overcome the above-mentioned disadvantages.

It is another object of this invention to provide a novel method of obtaining a resin-rich surface upon matched die molded resin articles without any of the previous disadvantages.

It is yet another object of this invention to provide a method as described in the above objects whereby the disadvantages generally associated with surfacing, such as the emission of styrene fumes, may be eliminated.

It is another object of this invention to provide new fiber-reinforced resinous articles characterized by weathering characteristics heretofore unobtainable.

It is another object of this invention to provide new glass fiber reinforced matched die molded articles possessed of good weathering properties and other desirable features.

Other objects and further scope of applicability of the present invention will become apparent from the detailed description given hereinafter.

BRIEF DESCRIPTION OF THE INVENTION

It has been discovered that the foregoing objects may be satisfied by utilizing a novel dry resin mixture. More specifically, it has been discovered that by utilizing certain dry, polymerization promoting monomeric materials with a powdered film-forming resin composition, a dry resin mixture may be used in place of the previously used gel without any of the disadvantages. The dry material is applied to at least one-half of the mold unit and during the subsequent molding operation, is transferred to the article. The articles produced by this method have demonstrated, in addition to good weathering characteristics, no surface fibers.

DETAILED DESCRIPTION OF THE INVENTION

A more complete understanding of the invention may be obtained by reference to the following example of operations within the scope of this invention. In this example all parts and percentages are by weight unless otherwise indicated.

*Example I*

One hundred parts of a powdered polyester resin was mixed with 7 parts N,N-methylenebisacrylamide and 2.5 parts benzoyl peroxide. The ingredients were milled in a porcelain ball mill for 45 minutes. Application was then made onto the hot mold surface by dusting through a 40 mesh screen in a thin layer onto the bottom platen of the 8 in. x 8 in. chromium plated mold. The temperature of the mold was 235° F. The cycle was completed by molding for five minutes using a P-43 polyester resin (Rohm and Haas Co.) reinforced with 3 plies of Owens Corning #219A low solubility 1½ oz. glass fiber mat. The surface coating became an integral part of the laminate during molding and formed a clear glossy non-porous layer.

Visual, miscroscopic and surface contour data for both weathered and unweathered samples were gathered to demonstrate the instant invention as represented by Example I.

Microscopic examination was conducted using a Bausch and Lomb binocular instrument at 20× with a 100-watt unfiltered light held at an angle between 0–10° of the surface examined.

The surface contour measurements were made using a Physicists Research Co. Type Q amplimeter (profilometer) under the following conditions: (a) The profilometer records according to the root mean square value of a standard sine wave, therefore, the micro-inch readings represent approximately only 70.7% of the actual peaks and valleys of the surface; (b) readings were made using a mechanically reciprocated arm holding the instrument head and moving through a linear distance of 3½ in. Accordingly the position of the sample was changed to make complete observation of the sample; and (c) the lowest values in micro-inches represent the smoothest conditions of the surface. The elimination of fiber pattern due to weathering is clearly evidenced by noting Samples 1 vs. 2 and 3 vs. 4. The weathering characteristics of products of the former method of liquid-gel coating are similar to those of the instant invention. However, the products of the liquid-gel coating method roughen more due to exposure of the necessary powdered filler incorporated with somewhat more prominent fiber pattern. The results of the test are set out below, in Table 1.

A wide variety of other molding resins, all known in the prior art, may be used, provided the cured resin has sufficient strength for the use intended and has the proper viscosity for molding. Typical resins are phenol formaldehyde, melamine formaldehyde, polyesters and silicones.

Other resin types in common use for making fiber-reinforced plastic pieces which may be used in the improved process of the present invention are the alkyd resins, styrenated alkyds, allyl resins, epoxy resins, in addition to the commercial unsaturated polyesters. The particular resin used is chosen dependent on the desired end product and undesirable types for particular uses may be readily discarded.

The instant procedure and composition may also be used in premix or potting and casting processes as well as laminating in matched dies or a continuous sheet.

It is now conventional to use a size on the fibers to

TABLE 1

[Evaluation of dry surfaced, liquid gelcoated, and untreated matched-die samples, weathered and unweathered, by visual, microscopic and profilometer examinations]

| Samples | Visual exam. | Microscopic examination (low-angle illumination) | | Profilometer (microinches) | |
|---|---|---|---|---|---|
| | | Surface condition | Type shadow cast | Ave. | Range |
| A. Weathered samples (1500 hrs.), Atlas Weatherometer: | | | | | |
| 1. Clear, dry-surfaced coat, neutral molding resin (Example I). | Smooth surface | Minor pitting, no surface fibers visible | None | 40 | 35–45 |
| 2. Untreated, neutral molding resin (Example I without surface coating). | Fibers exposed | Bare fibers protruding, powdery resin deposit. | Strong shadow | 100 | 80–180 |
| 3. Clear, dry-surfaced coat, black molding resin (Example I with black lacquer 1). | Smooth surface | Slight pitting, no surface fibers visible | None | 40 | 40–60 |
| 4. Untreated, black molding resin (Example I without surface coating). | Fibers exposed | Bare fibers protruding, powdery resin deposit, open bubbles. | Strong shadow | 120 | 100–200 |
| B. Unweathered samples (as molded): | | | | | |
| 5. Clear, dry-surfaced, coat lab-molded or chrome-plated dies (Example I). | Glossy, no fiber pattern. | Small pits and some open blisters, no fibers visible. | None | 25 | 20–40 |
| 6. Clear, dry-surfaced coat molded on unplated production mold (composition of Example I). | Not glossy no fiber pattern. | Smooth, very few open blisters, no fiber pattern. | do | 55 | 50–70 |
| 7. Normal as-molded surface, no surface treatment. | Fiber pattern very prominent. | Open bubbles and voids, portions of fibers exposed. | Strong shadow | 65 | 2 60–80 |
| 8. White liquid gel coat, production mold. | Glossy, prominent fiber pattern. | Smooth with some mold pits, many small open bubbles, fibers below surface evident. | Shadow from rounded, not sharp, ridges. | 25 | 2 25–30 |
| 9. White, liquid gel coat plus 15-mil surfacing veil-production mold. | do | Smooth with many minute open bubbles, fibers below surface evident. | Shadow not quite as strong as #8. | 25 | 2 20–30 |
| 10. 30-mil veil-mat, no gel coat, production mold. | Smooth and glossy, fiber pattern visible. | Smooth with some open bubbles. Fibers below surface evident. | Shadow not quite as strong as #8 or #9. | 30 | 2 30–40 |
| 11. Polished plate glass standard | Smooth | | | 8 | 7–9 |

1 The thin coating does not affect properties but greatly accentuates the visual appearance of the fiber pattern and other surface phenomena.
2 Needle jumps.

In carrying out the instant invention, one may utilize any of the heretofore employed fiber reinforcing media or resin. Regarding the fibers, glass fibers, asbestos, cellulose fibers and other materials may be utilized as heretofore.

The resin used may be any of the well known polyester resin resins. By polyester resin, as used herein, I mean the art recognized class of materials formulated by the reaction of a polycarboxylic acid or anhydride such as maleic acid and a polyhydric alcohol such as propylene glycol. It is preferable to employ a dihydric alcohol and a dibasic acid in order to insure maximum esterification of the components without excess viscosity. The resulting product is unsaturated and is used as such to be later subjected to proper conditions to effect polymerization. Generally, an unsaturated monomeric material is included as a carrier, which material enhances the polymerization of the polyester. Illustrative of such polyester materials are those sold under the trademark Laminac. Other useful polyester resins are Selectron, Paraplex and Plaskon, and sold under those trademarks respectively.

Various materials such as pigment may be added for decorative effect. It is desirable when practical to use the same resin for the coating as that used for the molded article for obvious reasons. However, dependent on the end result sought, various combinations of compatible resins are workable within the scope of this invention.

get a good bond with the molding resin, and the use of a size in this invention presents no difficulties. The saturated and unsaturated silanes, such as vinyl silane, have proved particularly effective and are among the many bonding agents which are suitable. These are often applied to the fiber by the commercial supplier of fiber and need be of no concern as to the process of this invention.

While the instant invention is meant to cover all fiber-reinforced plastic materials, it is particularly well adapted for glass fiber reinforced polyester materials. It has been found that when polyester materials are used, certain cross-linking agents have performed exceptionally well. Among those which have performed exceptionally well is N,N' - methylene-bisacrylamide. Additional materials are certain dry diallyl phthalates, such as Dapon-M and Dapon-35, and N,N-diallymelamine. These materials are similar in that they are white or colorless crystalline materials having relatively high melting points, i.e., about 150° C. It is understood, of course, that other materials may also be added to the resinous materials, such as pigments, other types of fillers, etc.

The amount of monomer cured in the composition may vary dependent upon the resin used and the desired result. Generally speaking, it is possible to employ from about 5% to about 60% monomer based on the resin composition with about 5–45% being preferred. The particular resin system used, of course, influences the temperature used to effect the cure, and it may vary from about 200° F. to about 350° F. Temperatures outside that range are, of course, permissible if proper selection of catalysts, accelerators, etc. are made.

The relation of the components of the fiber-reinforced article may vary widely as readily recognized in the art.

CONCLUSION

It is seen from the foregoing description that a new method of preparing matched die molded articles effectively overcomes the previous disadvantages. Further, the products of the invention are possessed of extremely good physical properties and particularly vastly improved weathering characteristics. These processes as products have found good commercial acceptance.

It is believed the above provides a complete description of the invention in such manner as to distinguish it from other inventions and from what is old, and provides a description of the best mode contemplated of carrying out the invention and thereby complies with the patent statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claim, when read in the light of the foregoing description.

What I claim is:

A method of providing an integral resin-rich surface in matched die molding of polyester resin articles comprising forming a moldable polyester resin base composition, inserting said base composition in a first half of a matched die mold, coating the interior of the second half of said mold with a dry powder composition consisting essentially of polyester resin powder, and a polymerization promoting monomeric material selected from the group consisting of N,N-methylene-biz-acrylamide, diallyl phthalate and N,N-diallyl melamine, contacting said second mold half with said first mold half so as to close said mold, and subjecting the mold to heat and pressure to fluidize the dry powder composition, transfer the fluidized composition from the second mold half to the polyester resin base as integral coating thereon, and cure the article to the molded shape.

References Cited by the Examiner

UNITED STATES PATENTS

| | | | |
|---|---|---|---|
| 2,372,433 | 3/45 | Koon | 161—109 |
| 2,965,532 | 12/60 | Taylor | 156—230 |
| 2,973,332 | 2/61 | Fikentscher et al. | |

EARL M. BERGERT, *Primary Examiner.*